(12) United States Patent
Falk et al.

(10) Patent No.: US 10,655,981 B2
(45) Date of Patent: May 19, 2020

(54) METHOD FOR UPDATING PARKING AREA INFORMATION IN A NAVIGATION SYSTEM AND NAVIGATION SYSTEM

(71) Applicant: Bayerische Motoren Werke Aktiengesellschaft, Munich (DE)

(72) Inventors: Andreas Falk, Hittistetten (DE); Christina Breining, Ulm (DE); Christian Connette, Langenau (DE); Sebastian Gruenwedel, Ulm (DE); Bernhard Kisslinger, Hohenkammer (DE); Benjamin Sobotta, Ulm (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 105 days.

(21) Appl. No.: 15/699,332

(22) Filed: Sep. 8, 2017

(65) Prior Publication Data

US 2017/0370746 A1 Dec. 28, 2017

Related U.S. Application Data

(63) Continuation of application No. PCT/EP2016/052033, filed on Feb. 1, 2016.

(30) Foreign Application Priority Data

Mar. 9, 2015 (DE) .................. 10 2015 204 169

(51) Int. Cl.
*G01C 21/36* (2006.01)
*G01C 21/32* (2006.01)
(Continued)

(52) U.S. Cl.
CPC ....... *G01C 21/3685* (2013.01); *G01C 21/005* (2013.01); *G01C 21/32* (2013.01);
(Continued)

(58) Field of Classification Search
CPC .. G01C 21/005; G01C 21/32; G01C 21/3602; G01C 21/3685; G08G 1/0112;
(Continued)

(56) References Cited

U.S. PATENT DOCUMENTS 8,063,797 B1 * 11/2011 Sonnabend ........ G06K 9/00791
340/932.2
8,890,715 B2 * 11/2014 Geelen .................. G01C 21/32
340/932.2

(Continued)

FOREIGN PATENT DOCUMENTS

DE 10 2009 028 024 A1 2/2011
DE 10 2010 033 215 A1 2/2012
(Continued)

OTHER PUBLICATIONS

German Search Report issued in counterpart German Application No. 10 2015 204 169.7 dated Feb. 5, 2016 with partial English-language translation (Fifteen (15) pages).

(Continued)

*Primary Examiner* — Atul Trivedi
(74) *Attorney, Agent, or Firm* — Crowell & Moring LLP (57) ABSTRACT

A method is provided for updating parking area information in a navigation system for a vehicle. The method includes the following steps: detecting a parking area by way of data received at least one device on at least one vehicle; determining information relating to the parking area which at least partially relates to characterizing characteristics of the parking area; analyzing the determined information in relation to an adequate characterization of the parking area; comparing the determined information with data of at least one database; and updating the database in the event of a deviation between the determined information and the data of the database.

12 Claims, 5 Drawing Sheets

(51) Int. Cl.
*G08G 1/01* (2006.01)
*G08G 1/14* (2006.01)
*G08G 1/0962* (2006.01)
*G01C 21/00* (2006.01)

(52) U.S. Cl.
CPC ....... *G01C 21/3602* (2013.01); *G08G 1/0112* (2013.01); *G08G 1/0129* (2013.01); *G08G 1/0141* (2013.01); *G08G 1/09623* (2013.01); *G08G 1/143* (2013.01)

(58) Field of Classification Search
CPC ............... G08G 1/0129; G08G 1/0141; G08G 1/09623; G08G 1/143
USPC .......................................................... 701/450
See application file for complete search history.

(56) References Cited

U.S. PATENT DOCUMENTS

| | | | | |
|---|---|---|---|---|
| 9,558,664 | B1* | 1/2017 | Gaebler | G01C 21/3492 |
| 2011/0224899 | A1* | 9/2011 | Mathews | G01C 21/3685 |
| | | | | 701/533 |
| 2012/0098677 | A1* | 4/2012 | Geelen | G01C 21/32 |
| | | | | 340/932.2 |
| 2012/0200430 | A1 | 8/2012 | Spahl | |
| 2012/0323643 | A1* | 12/2012 | Volz | G07B 15/02 |
| | | | | 705/13 |
| 2013/0325342 | A1* | 12/2013 | Pylappan | G10L 21/00 |
| | | | | 701/533 |
| 2014/0036076 | A1* | 2/2014 | Nerayoff | G06Q 50/30 |
| | | | | 348/148 |
| 2014/0285361 | A1* | 9/2014 | Tippelhofer | G08G 1/143 |
| | | | | 340/932.2 |
| 2014/0309934 | A1* | 10/2014 | Ricci | B60C 1/00 |
| | | | | 701/537 |
| 2014/0340242 | A1* | 11/2014 | Belzner | G08G 1/14 |
| | | | | 340/932.2 |
| 2015/0009047 | A1* | 1/2015 | Ashkenazi | G08G 1/144 |
| | | | | 340/932.2 |
| 2016/0012726 | A1* | 1/2016 | Wang | G08G 1/0112 |
| | | | | 340/932.2 |
| 2016/0155332 | A1* | 6/2016 | Wang | G01C 21/3685 |
| | | | | 340/932.2 |
| 2016/0171785 | A1* | 6/2016 | Banatwala | G08G 1/017 |
| | | | | 705/13 |
| 2016/0180712 | A1* | 6/2016 | Rosen | G08G 1/015 |
| | | | | 705/5 |
| 2016/0196747 | A1* | 7/2016 | Tsyrklevich | G08G 1/143 |
| | | | | 701/532 |
| 2016/0371607 | A1* | 12/2016 | Rosen | G06Q 10/02 |
| 2017/0098376 | A1* | 4/2017 | Wang | G01C 21/3685 |
| 2017/0144654 | A1* | 5/2017 | Sham | B60W 30/06 |
| 2017/0183001 | A1* | 6/2017 | Yamamoto | B60W 30/06 |
| 2018/0001930 | A1* | 1/2018 | Sham | B60W 30/06 |
| 2018/0060775 | A1* | 3/2018 | Singhal | G06Q 10/06313 |
| 2018/0060783 | A1* | 3/2018 | Stefik | G06Q 10/06398 |
| 2018/0060789 | A1* | 3/2018 | Stefik | G06F 16/25 |
| 2018/0060790 | A1* | 3/2018 | Stefik | G06Q 10/063114 |
| 2018/0060795 | A1* | 3/2018 | Stefik | G06Q 10/063116 |
| 2018/0060796 | A1* | 3/2018 | Stefik | G06Q 10/063116 |
| 2018/0060797 | A1* | 3/2018 | Stefik | G06Q 10/063116 |
| 2018/0060798 | A1* | 3/2018 | Stefik | G06Q 10/063116 |
| 2018/0232958 | A1* | 8/2018 | Wang | G07F 17/24 |
| 2018/0276700 | A1* | 9/2018 | Wang | G06Q 50/01 |
| 2018/0283894 | A1* | 10/2018 | Alneghaimish | G08G 1/015 |
| 2018/0313661 | A1* | 11/2018 | Eyster | G01C 21/3685 |
| 2018/0341888 | A1* | 11/2018 | Kislovskiy | G06Q 10/0635 |
| 2018/0349792 | A1* | 12/2018 | Zhao | G06K 9/00771 |
| 2018/0364063 | A1* | 12/2018 | Dorum | G01C 21/3685 |

FOREIGN PATENT DOCUMENTS

| | | |
|---|---|---|
| DE | 10 2011 003 772 A1 | 8/2012 |
| DE | 10 2011 086 268 A1 | 5/2013 |
| DE | 10 2013 203 909 A1 | 9/2014 |
| DE | 10 2014 209 453 A1 | 11/2015 |
| WO | WO 2010/081547 A1 | 7/2010 |

OTHER PUBLICATIONS

International Search Report (PCT/ISA/210) issued in PCT Application No. PCT/EP2016/052033 dated Apr. 14, 2016 with English-language translation (five (5) pages).

German-language Written Opinion (PCT/ISA/237) issued in PCT Application No. PCT/EP2016/052033 dated Apr. 14, 2016 (ten (10) pages).

* cited by examiner

METHOD FOR UPDATING PARKING AREA INFORMATION IN A NAVIGATION SYSTEM AND NAVIGATION SYSTEM

CROSS REFERENCE TO RELATED APPLICATIONS

This application is a continuation of PCT International Application No. PCT/EP2016/052033, filed Feb. 1, 2016, which claims priority under 35 U.S.C. § 119 from German Patent Application No. 10 2015 204 169.7, filed Mar. 9, 2015, the entire disclosures of which are herein expressly incorporated by reference.

BACKGROUND AND SUMMARY OF THE INVENTION

The present invention relates to a method for updating parking space information in a navigation system as well as to a navigation system that performs the method.

There currently are navigation systems which are equipped with the "point of interest" (POI) function. Using this function, it is possible, for example, to input public parking spaces as a target variable. Usually, this information is static and, at best, updated after a system update. However, this information can also be captured and maintained manually.

On account of manual activities, POI information is not always available in a current form and this therefore prevents the development of high-quality services in the field of parking.

Therefore, it is an object of the present invention to develop a solution, by means of which parking space information in a navigation system can be updated as quickly and easily as possible, but nevertheless in a reliable manner.

The invention is based on the discovery that this object can be achieved by virtue of at least one property of the parking space also being taken into account in addition to the position of the parking space if a change in parking space information is recognized.

In accordance with the first aspect, the invention relates to a method for updating parking space information in a navigation system for a vehicle. The method is characterized in that the method comprises the following steps:

recognizing a parking space by way of data captured at at least one apparatus on at least one vehicle;

determining parking space information in respect of the parking space, said information relating to at least partly characterizing properties of the parking space;

analyzing the determined information in relation to a sufficient characterization of the parking space;

comparing the determined information with data in at least one database; and updating the database if a deviation is present between the determined information and the data in the database.

In accordance with the present invention, updating parking space information include inputting a new parking space with the associated information into a database, deleting an entry of a parking space from a database, and changing the information in respect of a parking space in a database.

According to the invention, the navigation system includes at least one vehicle-side component and at least one central component. By way of example, the central component can constitute a server of a backend.

According to the invention, data by which a parking space can be recognized are captured at at least one apparatus on at least one vehicle. The data are preferably captured by sensors on a vehicle. Here, the data may therefore represent e.g. sensor data.

In particular, data from a camera, an ultrasonic sensor, an infrared sensor, and the like are used as sensor data.

According to the invention, recognizing a parking space denotes the presence of at least one property required for a parking space. Examples of necessary properties for a parking space include, for example, the presence of a parking space sign, the presence of a parking space character on the street, the presence of a parking line, etc.

Furthermore, parking space information in respect of the parking space is determined according to the invention, said parking space information relating to at least partly characterizing properties of the parking space. According to the invention, the parking space information can be determined on the basis of the captured data. By way of example, if a parking sign is recognized, a characterizing property that may be determined is that this is a parking sign for a residents' parking space. Additionally, or alternatively, the parking space information may also, however, be determined by way of input data which may be input into the navigation system by a vehicle user. Moreover, positional specifications are used as parking space information, these being determined, for example, by use of a positioning system such as GPS.

A further step of the method according to the invention consists in an analysis of the determined information in respect of a sufficient characterization of the parking space. A specification or list of information that is required for a sufficient characterization of the parking space may be stored in the navigation system. By way of example, the use conditions for the parking space may be specified as information that is required for the sufficient characterization, in addition to the position thereof. Hence, the result of the analysis may be that sufficient information is present or that further information needs to be determined.

According to the invention, the determined information is compared with data in at least one database. According to the invention, the database may be stored centrally, for example in a backend, in particular on a server of the backend. Alternatively or additionally, it is, however, also possible for the database or at least a copy of the database to be stored in the vehicle-side component of the navigation system. The database is also referred to as a navigation database. The comparison of the determined information may selectively be effectuated in the vehicle or in a central unit, in particular a backend.

In accordance with a further step, the method according to the invention includes updating the database if a deviation is present between the determined information and the data in the database.

The steps of the method according to the invention are not restricted to the sequence specified above. By way of example, the step of comparing with data in a database may be effectuated prior to the analysis of the determined data.

A particularly reliable update of the database can be effectuated using the method according to the invention by virtue of different items of information in relation to a parking space being used in the method when checking the currentness of the database. In particular, it is possible to monitor characterizing features in addition to the pure recognition that this is a new parking space, and so the presence or the change of said properties can be captured reliably.

In accordance with a preferred embodiment, parking space information is determined using user inputs.

Here, user inputs refer to input data or input information produced therefrom, which are input by a user of the vehicle, preferably by the driver of the vehicle, into the navigation system. This further improves the result of the update. The user inputs can serve to determine information or to check already determined information. The user inputs that can be used for determining information may, for example, include an entry by the user that the user, and hence their vehicle, is situated on a residents' parking space. The user inputs that can be used for checking the determined information may, for example, be a specification that the user, and hence their vehicle, is situated on a parking space.

The user inputs can be input by way of an interface of the navigation system. Here, use can be made, for example, of the input interface provided on the vehicle-side component, which may represent the HMI or a voice input apparatus.

In accordance with a preferred embodiment, a parking space is only recognized when a parking process is recognized. By way of example, the recognition of a parking process may be present if, for example, a slow drive with extreme steering movements or a reverse drive with extreme steering movement is recognized. Hence, the parking process is recognized by means of different sensors on the vehicle and different states of the vehicle.

The method can be simplified by virtue of the parking space only being recognized in this embodiment once a parking process has been recognized. Hence, it is possible to avoid an unnecessary amount of data, which would occur if a parking space recognition was effectuated continuously during the drive of the vehicle.

In accordance with a preferred embodiment, at least one prompt is output to a user of the vehicle in the case of a negative result of the analysis of the determined information in relation to a sufficient characterization of the parking space. In particular, the prompt to a user of the vehicle represents a prompt for inputting user inputs. By way of example, the prompt can represent a question to the user. Preferably, the prompt is designed in such a way that the user input required to fulfill the prompt is short. By way of example, the prompt may represent a multiple-choice question or a question which can be answered by a simple yes or no. By producing and outputting the prompt to the user, it is therefore possible to take into account the user feedback when updating the database and the updating result can therefore be improved. By virtue of the prompt to the user only being output in the case of a negative analysis result, bothering the user by prompts is firstly minimized and, secondly, the method is simplified. This is because if sufficient information is available for characterizing the parking space, the production and output of a prompt can be dispensed with.

The at least one prompt can be produced by a component of the vehicle or by an external component, in particular a backend component. The component of the vehicle at which the prompt can be produced is, in particular, the vehicle-side component of the navigation system. Since the prompt is preferably likewise output at this vehicle-side component of the navigation system, the data transfer is thus minimized. However, according to the invention, provision can also be made for the prompt to be produced at a backend component, in particular a server of the backend. In this embodiment, the prompt is then transferred for output purposes to a vehicle-side component, in particular the vehicle-side component of the navigation system. Producing the prompt at a central component, in particular a backend component, is advantageous since, in the production, data and information that was obtained from other vehicles for example can be taken into account.

In accordance with one embodiment, the comparison of the determined parking space information with data from at least one database is effectuated prior to the analysis of the determined information in respect of a sufficient characterization of the parking space. This embodiment is advantageous since it is already possible to recognize whether the determined information deviates from the data stored in the database at an early time in the method. Thus, it may be possible, for example, to recognize during the comparison with the database that this is a parking space which is already stored in the database. In this case, the analysis can then be restricted to the characterizing information since the fundamental information, such as the position of the parking space, is already present in the database.

However, alternatively, the comparison of the parking space information with the data from the database can also be effectuated after the analysis of the determined information in relation to a sufficient characterization of the parking space. In this case, the user inputs possibly already requested in the case of a negative analysis result may also be taken into account during the comparison, and the updating result may thus be improved.

In accordance with a further aspect, the invention relates to a navigation system for a vehicle, comprising at least one vehicle-side component. The navigation system is characterized in that it comprises at least a vehicle-side recognition unit for recognizing a parking space, at least one determination unit for determining parking space information; at least one analysis unit for analyzing determined information in relation to a sufficient characterization of the parking space, at least one comparison unit for comparing the ascertained information with data from at least one database, and at least one update unit for updating the database.

Advantages and features which were described with respect to the method according to the invention—to the extent that these are applicable—apply accordingly to the navigation system according to the invention, and vice versa.

The units of the navigation system may also be present, at least in part, as software or programs.

The at least one recognition unit for recognizing a parking space is arranged on the vehicle side and may include one or more sensors or may be connected to one or more sensors. In particular, the recognition unit can be integrated in the vehicle-side component of the navigation system, or it is at least connected to the latter.

The at least one determination unit for determining parking space information may, according to the invention, be provided on the vehicle side or in a central component of the navigation system, for example a backend server. The determination unit is connected to the recognition unit or embodied in one unit together with the latter. In particular, the determination unit is designed for receiving data that was captured at the vehicle.

The at least one analysis unit for analyzing determined information in relation to a sufficient characterization of the parking space may likewise be provided either on the vehicle side or in a central component. The analysis unit may include a memory unit or may be connected to a memory unit. Specifications or a list of the information required for characterizing the parking space can be stored in the memory unit. The analysis unit is preferably connected to the determination unit and/or the capture unit for receiving data or information.

Furthermore, the navigation system includes at least one comparison unit for comparing the determined information with data from at least one database. The comparison unit may likewise be provided either on the vehicle side or in a central component. The comparison unit may be connected to the analysis unit, the determination unit and/or the capture unit for receiving data or information.

Finally, the navigation system includes at least one update unit for updating the database. The update unit may likewise be provided either on the side of the vehicle or in a central component. The update unit may be connected to the comparison unit and/or the analysis unit for receiving data or information.

Updating of the database may be improved by virtue of, according to the invention, parking space information being determined and being subject to an analysis and a comparison.

In accordance with one embodiment, the navigation system includes at least one prompt unit for producing at least one prompt for a user of the vehicle, and at least one user input unit. The prompt unit may be provided on the vehicle side or on a central component, in particular a backend server. The user input unit is arranged on the vehicle side and may, for example, be integrated into the vehicle-side component of the navigation system. Moreover, an output unit is provided on the vehicle side and, in particular, on the vehicle-side component of the navigation system, said output unit being able to be used to output the prompt to the user. The output unit may constitute a display or an acoustic output unit. The user input unit may be a keyboard or another unit for the manual input of information. However, alternatively, the user input unit may also constitute an acoustic unit, in particular with a microphone.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
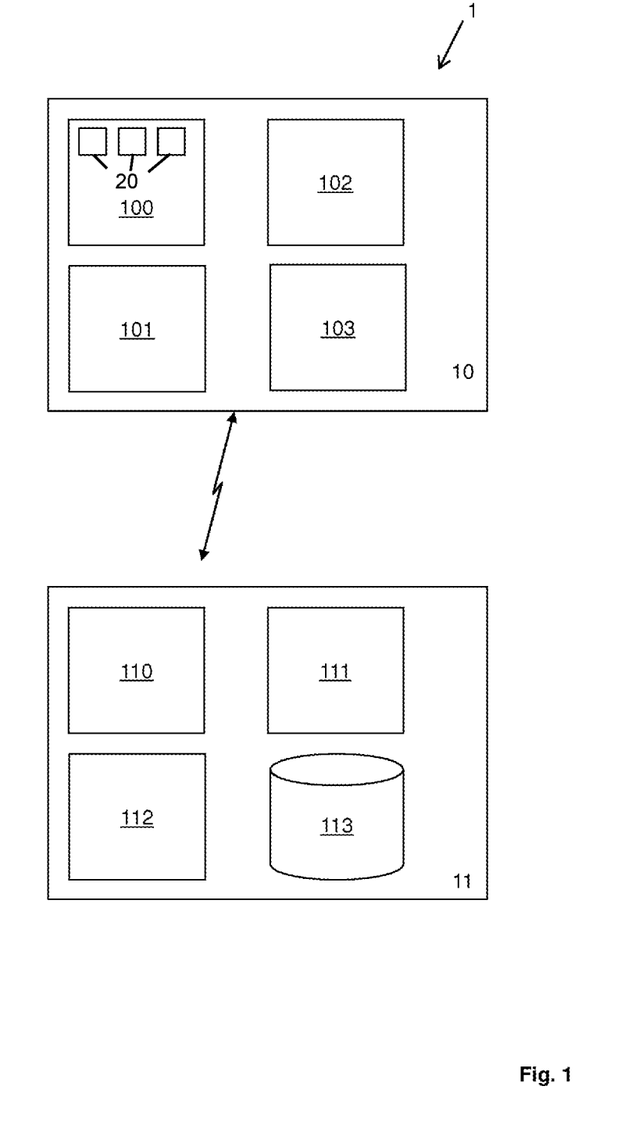
FIG. 1 is a schematic diagram of an embodiment of a navigation system.

FIG. 1 schematically illustrates several components of an embodiment of the navigation system 1 according to the invention. In particular, a vehicle-side component 10 and a central component 11 are shown. It is understood that the navigation system 1 may have more than one vehicle-side component 10 and more than one central component 11. In particular, the vehicle-side component 10 may represent an onboard unit, which can be installed in the vehicle, or fastened thereto and connected therewith. By way of example, the central component 11 may represent a backend component, in particular a backend server, and it is also referred to as such below. In the presented embodiment, a recognition unit 100, a determination unit 101, a comparison unit 102, and a user input unit 103 are provided in the vehicle-side component 10. The recognition unit 100 includes a plurality of sensors 20 which, alternatively, may also be connected to the recognition unit 100. In the presented embodiment, the central component 11 includes an analysis unit 110, a prompt unit 111, an update unit 112, and a database 113. Deviating from FIG. 1 and as already explained above, the units may, at least in part, also be provided in the respective other component of the navigation system 1. By way of example, the analysis unit 110 and/or the prompt unit 111 could be provided at the vehicle-side component 10.

Moreover, the units may, at least in part, be combined in a common unit. Thus, for example, the recognition unit may be combined with the determination unit. The units of the navigation system 1 are, at least in part, implemented as software on the respective component of the navigation system 1.

Figure 2:
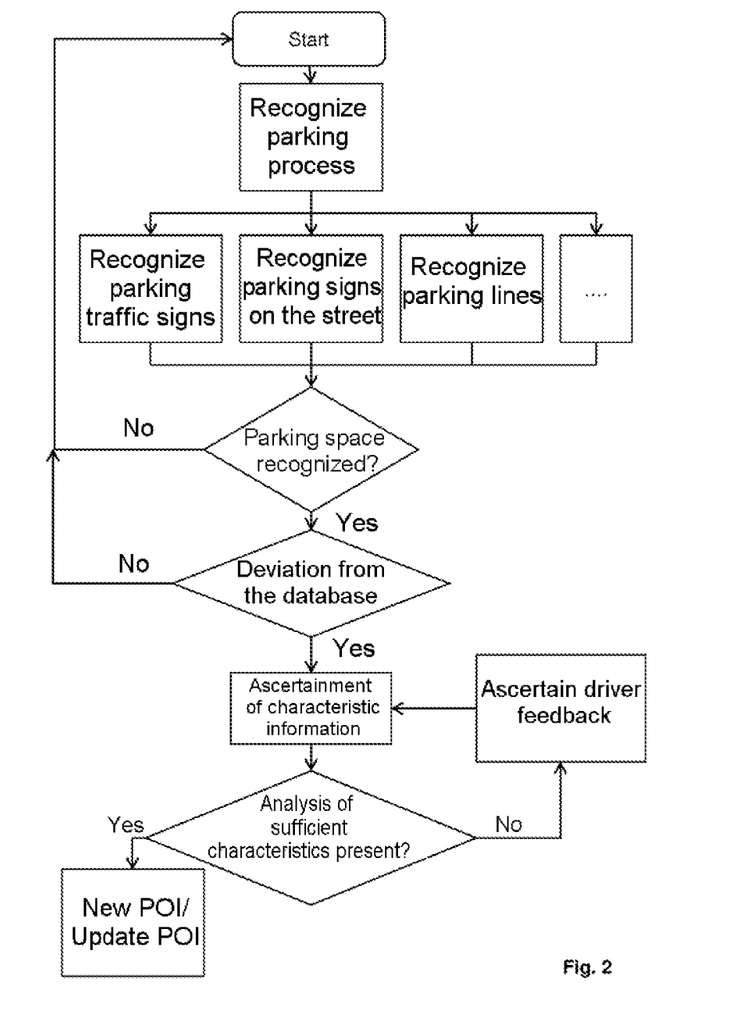
FIG. 2 is a flowchart of a first embodiment of the method according to the invention.

FIG. 2 shows a flowchart of a first embodiment of the method according to the invention. In a first step, there is monitoring as to whether the vehicle is executing a parking process. This may be effectuated by use of sensors on the vehicle. If a parking process is identified, a check is carried out in a next step as to whether this is a parking space. To this end, data are captured by different sensors, e.g. cameras, which for example render it possible to recognize parking traffic signs, parking signs on the street, parking lines, etc. Then, the data captured is used to determine whether this is a parking space, i.e. whether a parking space is recognized.

If the location on which the vehicle stands is not identified as a parking space, the method restarts with the monitoring and detection of parking processes.

By contrast, if a parking space is identified, the information that is available in relation to the parking space can be compared with data from a database in accordance with the first embodiment. By way of example, the information available in relation to the parking space may be the position of the parking space. If there is no deviation from the data in the database, the method can once again start with monitoring and detecting parking processes. By contrast, if there is a difference, the assumption can be made that the database needs to be updated. To this end, characteristic information with respect to the parking space may be determined in accordance with the embodiment according to FIG. 2, said characteristic information representing characteristic properties of the parking space. By way of example, whether the parking space is a residents' parking space. This information can be determined from the data captured at the vehicle. To this end, use can be made of signs, such as supplementary signs, which specify that this is a residents' parking space. The information determined thus is subject to an analysis as to whether it suffices for characterizing the parking space. By way of example, if it is specified that the information as to whether this is a parking space that can only be used with time restrictions is necessary for characterizing the parking space, but if no information in this respect is available, it is possible to determine driver feedback. To this end, a prompt to the driver of the vehicle can be produced and preferably output on the vehicle-side component of the navigation system, within the scope of which the driver is prompted to provide the missing information. By way of example, the prompt could be the question: "Is the current parking space a parking space with time restrictions?" The response of the driver, which can be input by the latter into the navigation system, may then be used again for determining characteristic information. As soon as the analysis of the determined data is positive, the database may be modified or complemented accordingly.

Figure 3:
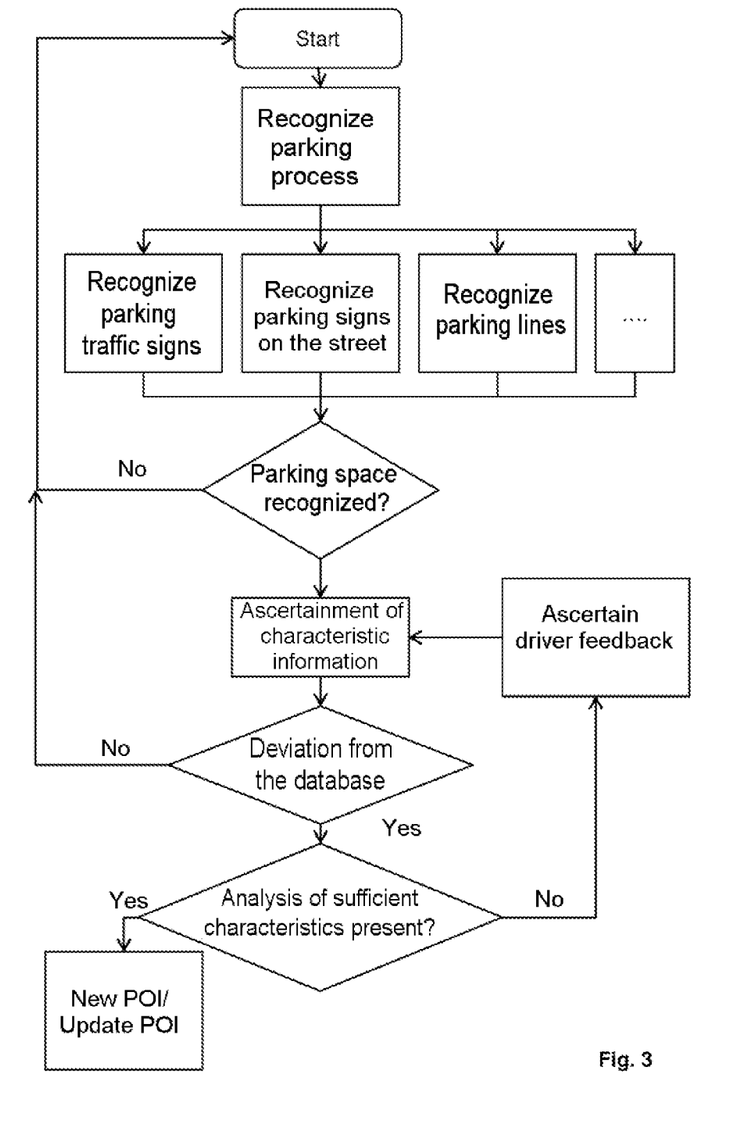
FIG. 3 is a flowchart of a second embodiment of the method according to the invention.

FIG. 3 shows a further embodiment of the method according to the invention. This second embodiment differs from the first embodiment according to FIG. 2 in that, in the second embodiment, the characteristic information is determined before the comparison with the data in the database. In this embodiment, the recognition of the parking space and the determination of characteristic information may also be effectuated at the same time. In particular, when evaluating image sensor data, it is possible to recognize simultaneously whether a parking sign is present and whether a supplementary sign is possibly present.

Figure 4:
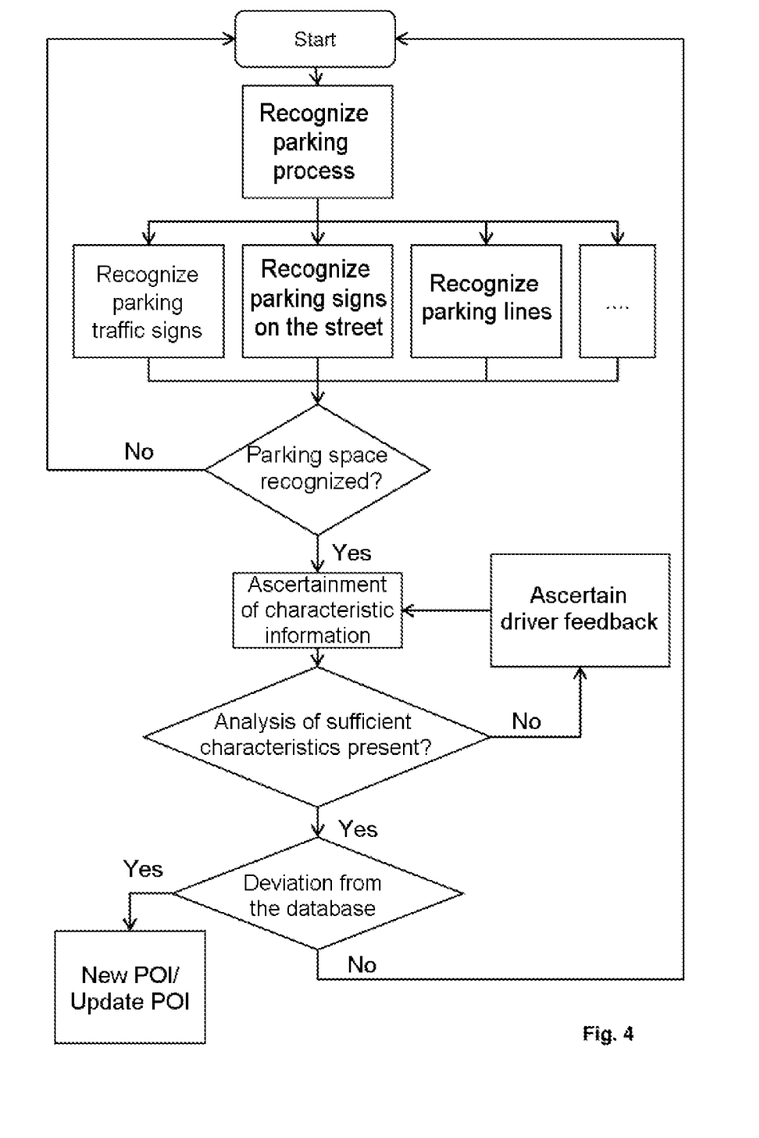
FIG. 4 is a flowchart of a third embodiment of the method according to the invention.

FIG. 4 shows a third embodiment of the method according to the invention. In this embodiment, in contrast to the second embodiment, the analysis as to whether sufficient characteristic information is available is effectuated before the comparison with the database.

Figure 5:
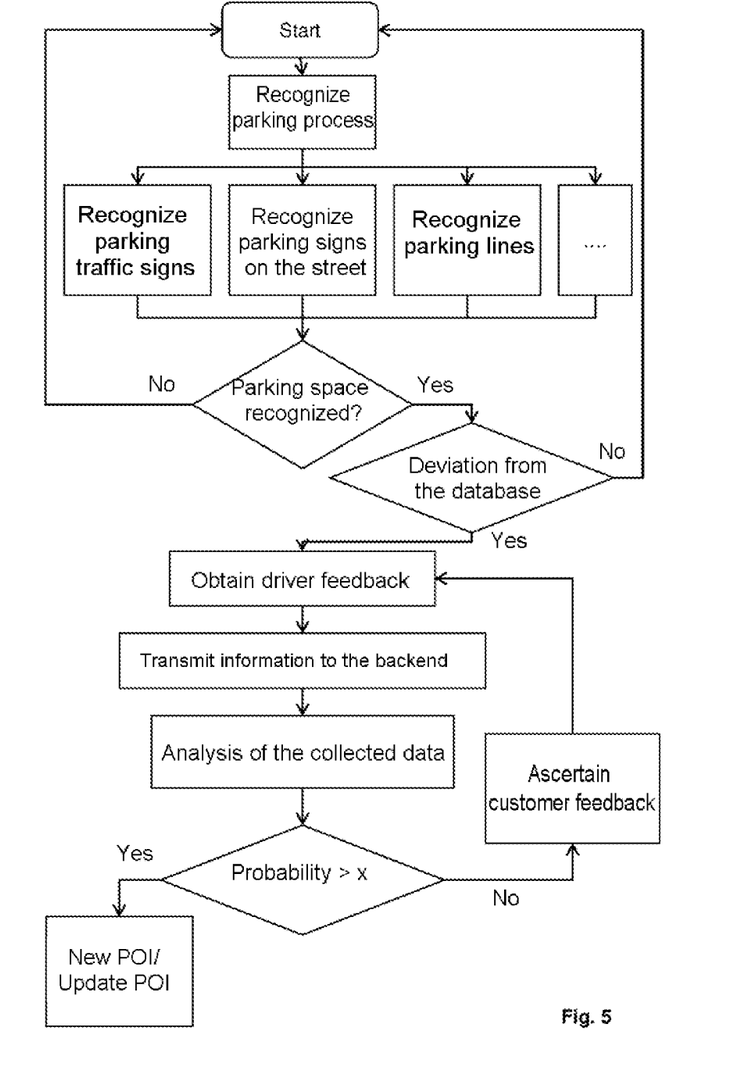
FIG. 5 is a flowchart of a fourth embodiment of the method according to the invention.

FIG. 5 shows a fourth embodiment of the method according to the invention. FIG. 5 only shows some of the steps of the method. In particular, determining characteristic information, analyzing the characteristics and driver feedback have not been shown. These steps can be carried out prior to or after the comparison with the data from the database, in accordance with the first, second or third embodiment. However, it is also possible not to carry out at least the step of determining the driver feedback. If a deviation from the data in the database is recognized in the fourth embodiment according to FIG. 5, it is possible to obtain driver feedback. Obtaining this driver feedback may serve to check the information that has already been determined. The information determined thus at the vehicle is transmitted to a central component, in particular to a component of the backend. At the backend, it is possible to process information received from a plurality of vehicles, i.e. from a plurality of vehicle-side components of the navigation system, together. Here, a check can be carried out as to whether the probability that the information which is available is applicable and sufficient to justify an update of the database. By way of example, a check may be carried out here as to whether the information that was received in relation to a parking space from a vehicle-side component of a vehicle deviates from the information received in relation to the same parking space from a different vehicle. In this case, it is possible to determine so-called customer feedback. To this end, it is possible to output a prompt to the driver of a vehicle which is currently situated on the parking space in question.

The present invention has a number of advantages. New parking spaces can be incorporated very quickly into the navigation database. Parking spaces that are no longer available, for example due to construction measures, may be determined using the present invention, may be removed from the navigation database and are therefore no longer displayed to the user. Moreover, properties of the parking spaces, which may have changed over time, may also be taken into account in the invention. Thus, a public parking space, which was turned into a residents' parking space or which was provided with time restrictions, may be recognized to have these new properties and this information can reliably be transferred to the backend. Hence, updates or new parking space POI information may be determined with or without customer feedback and may be provided to the users as quickly as possible and with increasing quality in the navigation system. The inclusion of the user is effectuated by way of a feedback component, such as e.g. speech (yes/no answer), or manually (yes/no buttons on the HMI).

As a result, the effort required on the part of a vehicle occupant is kept very low and the acceptance for answering increases.

LIST OF REFERENCE SIGNS

1 Navigation system
10 Vehicle-side component
20 Sensors
100 Recognition unit
101 Ascertainment unit
102 Comparison unit
103 User input unit
11 Central component
110 Analysis unit
111 Prompt unit
112 Update unit
113 Database The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for improved navigation to parking spaces via vehicle navigation systems, the method comprises the acts of:
    recognizing a parking space based on sensor data captured by at least one sensor on at least one vehicle, the sensor data reflecting the surroundings of the at least one vehicle;
    determining information relating to the parking space at least in part from said captured sensor data, said information at least partly characterizing properties of the parking space independent of whether the parking space is occupied;
    analyzing the determined information in relation to a sufficient characterization of the parking space;
    comparing the determined information with data in at least one database;
    updating the database if a deviation is present between the determined information and the data in the database; and
    navigating one or more vehicles to the parking spaces, each via a respective navigation system, using the updated database.

2. The method as claimed in claim 1, wherein the parking space information is determined using user inputs.

3. The method as claimed in claim 2, wherein a parking space is only recognized when a parking process is recognized.

4. The method as claimed in claim 1, wherein a parking space is only recognized when a parking process is recognized.

5. The method as claimed in claim 1, wherein at least one prompt is output to a user of the vehicle in the case of a negative result of the analysis of the determined information in relation to a sufficient characterization of the parking space.

6. The method as claimed in claim 5, wherein the at least one prompt is produced by a component of the vehicle or by a central component of the navigation system.

7. The method as claimed in claim 6, wherein the component is a backend component.

8. The method as claimed in claim 1, wherein the comparison of the determined parking space information with data in the at least one database is effectuated prior to the analysis of the determined information in relation to a sufficient characterization of the parking space.

9. The method as claimed in claim 1, wherein the data used to recognize the parking space are captured by at least one sensor of a vehicle.

10. A navigation system for a vehicle, comprising:
   at least a vehicle-side recognition unit that recognizes a parking space based on sensor data captured by at least one sensor on the vehicle, the sensor data reflecting the surroundings of the vehicle,
   at least one determination unit that determines parking space information at least in part from said captured sensor data, said information at least partly characterizing properties of the parking space independent of whether the parking space is occupied;
   at least one analysis unit that analyzes the determined information in relation to a sufficient characterization of the parking space;
   at least one comparison unit that compares the determined information with data from at least one database; and
   at least one update unit that updates the database, wherein the navigation system uses the updated database to provide vehicle navigation to parking spaces.

11. The navigation system as claimed in claim 10, further comprising:
   at least one prompt unit that produces at least one prompt for a user of the vehicle; and
   at least one user input unit.

12. A computer product comprising a non-transitory computer readable medium having stored thereon program code segments that, when executed by a processor, carry out the acts of:
   recognizing a parking space based on sensor data captured by at least one sensor on at least one vehicle, the sensor data reflecting the surroundings of the at least one vehicle;
   determining information relating to the parking space at least in part from said captured sensor data, said information relating to at least partly characterizing properties of the parking space independent of whether the parking space is occupied;
   analyzing the determined information in relation to a sufficient characterization of the parking space;
   comparing the determined information with data in at least one database;
   updating the database if a deviation is present between the determined information and the data in the database; and
   navigating one or more vehicles to parking spaces, each via a respective navigation system, using the updated database.

* * * * *